(12) United States Patent
Katkam et al.

(10) Patent No.: US 7,899,161 B2
(45) Date of Patent: Mar. 1, 2011

(54) VOICEMAIL MESSAGING WITH DYNAMIC CONTENT

(75) Inventors: Vinod Katkam, San Jose, CA (US); Mukul Jain, San Jose, CA (US); Sanjeev Kumar, San Francisco, CA (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1176 days.

(21) Appl. No.: 11/546,265

(22) Filed: Oct. 11, 2006

(65) Prior Publication Data

US 2008/0089489 A1  Apr. 17, 2008

(51) Int. Cl.
*H04M 11/06* (2006.01)
(52) U.S. Cl. ............ 379/88.13; 379/88.16; 379/88.25; 379/93.24
(58) Field of Classification Search ............ 375/316; 379/88.01, 88.13, 88.18, 88.16, 88.25, 93.24; 705/14.26; 709/206
See application file for complete search history.

(56) References Cited

U.S. PATENT DOCUMENTS

| | | | |
|---|---|---|---|
| 4,993,022 A | 2/1991 | Kondo et al. | |
| 5,675,778 A | 10/1997 | Jones | |
| 5,729,687 A | 3/1998 | Rothrock et al. | |
| 5,872,925 A | 2/1999 | Han | |
| 5,983,192 A | 11/1999 | Botzko et al. | |
| 5,987,106 A | 11/1999 | Kitamura | |
| 6,009,519 A | 12/1999 | Jones et al. | |
| 6,014,427 A | 1/2000 | Hanson et al. | |
| 6,236,854 B1 | 5/2001 | Bradshaw, Jr. | |
| 6,259,405 B1 | 7/2001 | Stewart et al. | |
| 6,342,903 B1 | 1/2002 | Fado et al. | |
| 6,363,352 B1 | 3/2002 | Dailey et al. | |
| 6,438,215 B1 | 8/2002 | Skladman et al. | |
| 6,496,201 B1 | 12/2002 | Baldwin et al. | |
| 6,501,739 B1 | 12/2002 | Cohen | |
| 6,545,596 B1 | 4/2003 | Moon | |
| 6,590,604 B1 | 7/2003 | Tucker et al. | |
| 6,604,078 B1 | 8/2003 | Shimazaki | |
| 6,608,820 B1 | 8/2003 | Bradshaw, Jr. | |
| 6,633,630 B1 * | 10/2003 | Owens et al. ............ 379/93.24 |
| 6,671,262 B1 | 12/2003 | Kung et al. | |

(Continued)

FOREIGN PATENT DOCUMENTS

EP  1 170 726 A  1/2002

OTHER PUBLICATIONS

Greg Vaundreuil Lucent Technologies Glenn Parsons Nortel.

(Continued)

*Primary Examiner*—Gerald Gauthier
(74) *Attorney, Agent, or Firm*—The Law Offices of Bradley J. Bereznak

(57) ABSTRACT

In one embodiment, a voicemail messaging system provides a user with the ability to record a voicemail message that includes at least one static portion and a dynamic content portion. When the voicemail message is accessed for listening by a recipient the dynamic content portion is filled with information retrieved via a URL link. It is emphasized that this abstract is provided to comply with the rules requiring an abstract that will allow a searcher or other reader to quickly ascertain the subject matter of the technical disclosure.

26 Claims, 4 Drawing Sheets

U.S. PATENT DOCUMENTS

| | | | |
|---|---|---|---|
| 6,674,451 B1 | 1/2004 | Fado et al. | |
| 6,731,724 B2 * | 5/2004 | Wesemann et al. | 379/88.16 |
| 6,732,080 B1 | 5/2004 | Blants | |
| 6,785,868 B1 | 8/2004 | Raff | |
| 6,816,469 B1 | 11/2004 | Kung et al. | |
| 6,865,540 B1 | 3/2005 | Faber et al. | |
| 6,876,734 B1 | 4/2005 | Summers et al. | |
| 6,885,900 B1 | 4/2005 | Rybicki et al. | |
| 6,889,054 B2 | 5/2005 | Himmel et al. | |
| 6,898,569 B1 | 5/2005 | Bansal et al. | |
| 6,901,413 B1 | 5/2005 | Wu | |
| 6,905,414 B2 | 6/2005 | Danieli et al. | |
| 6,907,112 B1 | 6/2005 | Guedalia et al. | |
| 6,909,778 B2 | 6/2005 | Wengrovitz | |
| 6,931,001 B2 | 8/2005 | Deng | |
| 6,931,113 B2 | 8/2005 | Ortel | |
| 6,970,908 B1 | 11/2005 | Larky | |
| 6,985,745 B2 | 1/2006 | Quaid | |
| 6,987,744 B2 | 1/2006 | Harrington et al. | |
| 7,058,356 B2 | 6/2006 | Slotznick | |
| 7,124,087 B1 | 10/2006 | Rodriguez et al. | |
| 7,212,614 B1 * | 5/2007 | Burg et al | 379/88.18 |
| 7,343,312 B2 | 3/2008 | Capek et al. | |
| 7,493,269 B2 * | 2/2009 | Fostick et al. | 705/14.26 |
| 7,583,657 B1 | 9/2009 | Webster et al. | |
| 7,624,259 B2 | 11/2009 | Bear et al. | |
| 2002/0037074 A1 | 3/2002 | Dowens et al. | |
| 2002/0093683 A1 | 7/2002 | Focazio et al. | |
| 2002/0098831 A1 | 7/2002 | Castell et al. | |
| 2002/0124057 A1 | 9/2002 | Besprosvan | |
| 2002/0140745 A1 | 10/2002 | Ellenby et al. | |
| 2003/0046344 A1 | 3/2003 | Kumhyr et al. | |
| 2003/0130014 A1 | 7/2003 | Rucinski | |
| 2003/0149605 A1 | 8/2003 | Cragun et al. | |
| 2003/0152214 A1 | 8/2003 | Mori et al. | |
| 2004/0047461 A1 | 3/2004 | Weisman | |
| 2004/0086095 A1 | 5/2004 | Dixit | |
| 2004/0088362 A1 | 5/2004 | Curbow et al. | |
| 2004/0105529 A1 | 6/2004 | Salvucci et al. | |
| 2004/0156485 A1 | 8/2004 | Poustchi et al. | |
| 2004/0162747 A1 | 8/2004 | Yeh et al. | |
| 2004/0225650 A1 | 11/2004 | Cooper | |
| 2004/0234046 A1 | 11/2004 | Skladman et al. | |
| 2004/0267527 A1 | 12/2004 | Creamer et al. | |
| 2005/0015444 A1 | 1/2005 | Rambo | |
| 2005/0037739 A1 | 2/2005 | Zhong | |
| 2005/0066005 A1 | 3/2005 | Paul et al. | |
| 2005/0135383 A1 | 6/2005 | Shenefiel | |
| 2005/0157708 A1 | 7/2005 | Chun | |
| 2005/0177622 A1 | 8/2005 | Spielman et al. | |
| 2005/0210112 A1 | 9/2005 | Clement et al. | |
| 2005/0262208 A1 | 11/2005 | Haviv et al. | |
| 2005/0267761 A1 | 12/2005 | Ueno | |
| 2005/0288987 A1 | 12/2005 | Sattler et al. | |
| 2006/0031326 A1 | 2/2006 | Ovenden | |
| 2006/0047557 A1 | 3/2006 | Bieselin et al. | |
| 2006/0078120 A1 | 4/2006 | Mahendran et al. | |
| 2006/0122835 A1 | 6/2006 | Huart et al. | |
| 2006/0123082 A1 | 6/2006 | Digate | |
| 2006/0140355 A1 * | 6/2006 | Handekyn | 379/88.01 |
| 2006/0146735 A1 | 7/2006 | Shaffer et al. | |
| 2006/0193459 A1 | 8/2006 | Cadiz et al. | |
| 2006/0253593 A1 | 11/2006 | Jachner | |
| 2006/0274856 A1 * | 12/2006 | Dunn et al. | 375/316 |
| 2007/0016465 A1 | 1/2007 | Schaad | |
| 2007/0016643 A1 | 1/2007 | Boss et al. | |
| 2007/0033258 A1 | 2/2007 | Vasilaky | |
| 2007/0036290 A1 | 2/2007 | Gasparri | |
| 2007/0266101 A1 * | 11/2007 | Patel et al. | 709/206 |
| 2007/0280433 A1 * | 12/2007 | Milstein et al. | 379/67.1 |
| 2007/0280434 A1 * | 12/2007 | Howell et al. | 379/67.1 |
| 2007/0280435 A1 * | 12/2007 | Smith | 379/67.1 |
| 2008/0086530 A1 | 4/2008 | Gandhi et al. | |
| 2008/0089489 A1 * | 4/2008 | Katkam et al. | 379/88.13 |

OTHER PUBLICATIONS

IETF Standart-Working-Draft, Internet Engineering Task Force, IETF, CH, Feb. 1, 1999, 47 pages.

* cited by examiner

<segment₁> <dynamic-content-variable> <segment₂>

VOICEMAIL MESSAGING WITH DYNAMIC CONTENT

TECHNICAL FIELD

This disclosure relates generally to telephony and messaging.

BACKGROUND

Voicemail systems for use in storing and retrieving voicemail messages have been deployed for more than a decade. Today, voicemail messaging may be found in a unified messaging system (UMS) that handles voice, facsimile and regular text messages as objects in a single mailbox that a user can access either with a regular email client, or by telephone. A UMS typically connects to an IP-PBX to provide automated attendant, audiotext, and voice mail services to subscribers or users. For instance, a personal computer (PC) user with multimedia capabilities can open and playback voice messages, either as speech or text. Similarly, a person may retrieve their email messages as speech from a voice-over-IP (VoIP) phone connected through an IP network, or from a traditional telephone device connected with the enterprise via a conventional public switched telephone network (PSTN). Unified messaging is thus particularly convenient for mobile business users because it allows them to reach colleagues and customers through a PC or telephone device, whichever happens to be available.

Existing voicemail systems—whether implemented in a UMS or as a separate, stand-alone system—provide different functionalities such as the scheduling of a voice message, sending of the same voicemail to multiple people, saving of voicemail messages in a repository, etc. The content of the voicemail message, however, is static; i.e., its content does not change once the message has been left on the voicemail system. To put it differently, the entire content of the voicemail message in current voicemail systems is determined at the time the message is recorded. This means that if important conditions or information changes, a person may have to leave one (or multiple) new voicemail messages with the same recipient informing them of the new information and telling them to disregard the previous message.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, device types, communication methods, etc., in order to provide a thorough understanding of the present invention. However, persons having ordinary skill in the relevant arts will appreciate that these specific details may not be needed to practice the present invention.

According to one embodiment, a mechanism is provided for a voicemail messaging system that allows a user to dynamically alter portions of the content of a voicemail message, depending on context, information available at listening time, current conditions, variables, etc., when leaving the voice message. In other words, the content of a voicemail message at the time that the message is heard may be different than at the time it was recorded, depending on conditional information/variables. In a further embodiment, the voicemail system is configured to take specified actions based on tags inserted into the voicemail message by the user.

Figures 1, 2:
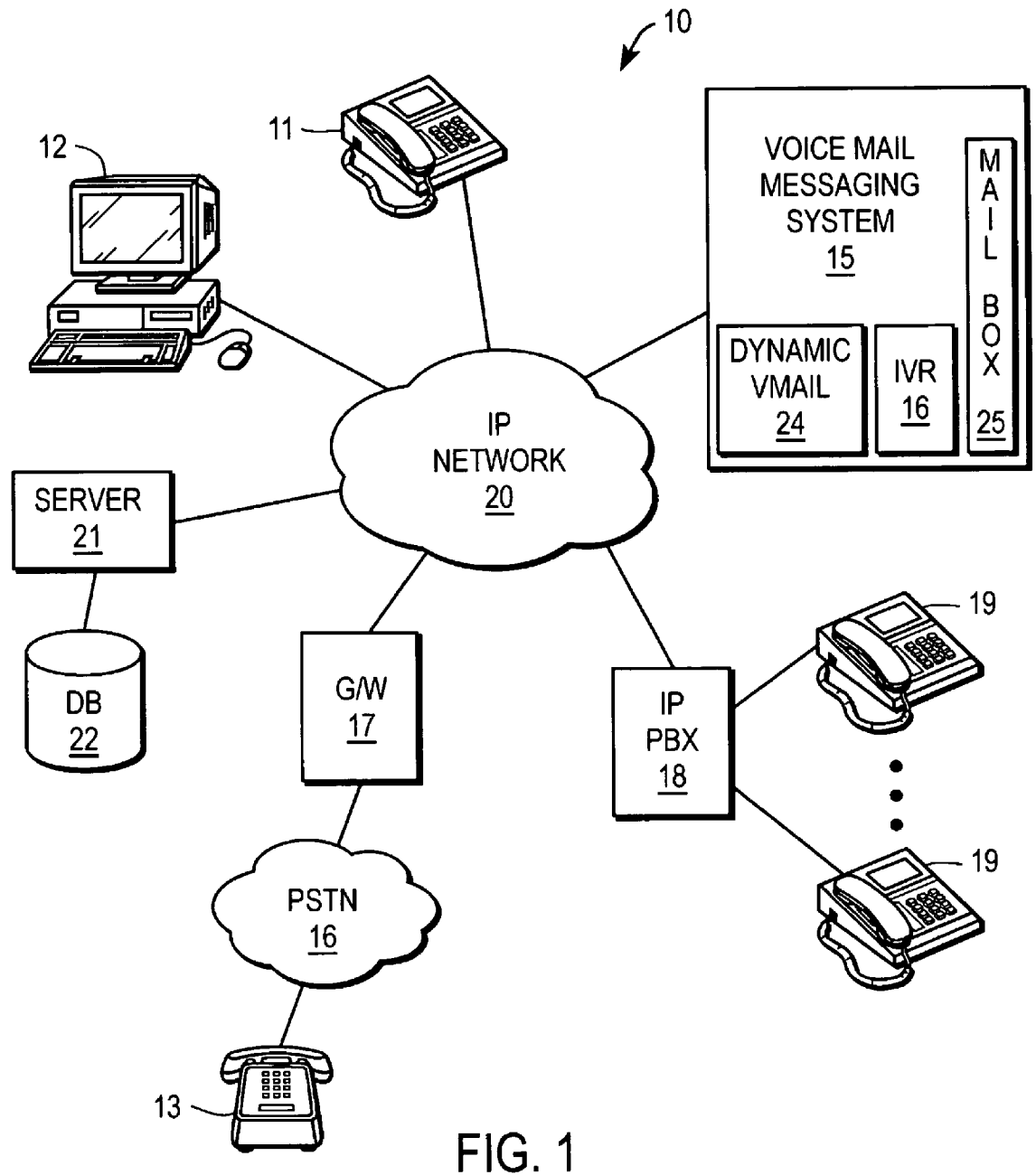
FIG. 1 illustrates an example telephony/communication system.
FIG. 2 illustrates an example message format that includes static segments and a dynamic content portion.

FIG. 1 illustrates an example telephony/communication system 10 that includes a voicemail messaging system 15 having a mailbox 25 (e.g., memory) for storing recorded messages, and an embedded IVR system 16 connected with a plurality of users or endpoint devices via an IP network 20. System 15 may comprise a stand-alone voicemail system or, alternatively, be included in a UMS. A caller may leave a voicemail message in mailbox 25 for another person or recipient by calling into system 15 across IP network 20 directly from a voice-over-IP (VoIP) phone 11 or from traditional time-division multiplexing (TDM) telephone device 13 connected to IP network 20 via a VoIP gateway 17 and PSTN 16. In another instance, the user may call voicemail messaging system 15 to leave a message for someone utilizing a PC 12 that has telephony, telephone, and/or other telecommunications functions installed for placing packet-based calls over IP network 20. It is appreciated that PC 12 may also include a graphical user interface (GUI) comprising a collaborative web-based application (provided by system 15 or a server 21) that is accessed by the browser software running on PC 12. In other instances, the GUI running on PC 12 may comprise a downloaded application of computer-executable code that may be loaded or accessed by PC 12.

Also shown in FIG. 1 is an IP-Private Branch Exchange (PBX) 18 connected to IP network 20 and also to a number of individual phones 19. It is appreciated that in certain implementations, voicemail messaging system 15 may reside on or be connected directly to IP-PBX 18, or that IP-PBX 18 may be implemented with its own separate voicemail or unified messaging system. In any case, a person may use any of the telephone or endpoint devices shown in FIG. 1 to call system 15 to retrieve a voice mail message stored therein. In another embodiment a recipient may listen to a voicemail message using a cellular telephone (not shown) over a voice channel of a wireless cellular network connected to IP network 20 or directly to IP-PBX 18. PC 12 may also provide a user with multimedia capabilities thereby allowing a user to open and playback voicemail messages, either as speech or text. Similarly, a person may retrieve their email messages as speech from a voice-over-IP (VoIP) phone connected through an IP network, or from a traditional telephone device connected with the enterprise via a conventional public switched telephone network (PSTN).

Voicemail messaging system 15 is configured with a software (or firmware) module 24 or software "plug-in" that allows a caller to insert a dynamic, real-time data element, expression, or variable into a voicemail message along with static portions or segments. In one implementation, dynamic voicemail module 24 is integrated into an application program such as Cisco's Unity integrated system. In other implementations, the module 24 may comprise a separate application embodied in a software module, a hardware/firmware module, or other computer product that includes executable code for performing the methods and operations of the system described herein.

In accordance with one embodiment, the dynamic portion of the message is treated as an object, with the dynamic portion or variable being filled by system 15 at a time when the voicemail message is retrieved by the intended recipient (callee). By way of example, the dynamic portion or variable within the voicemail message may be filled by system 15 accessing a current value of the variable or information stored in server 21 or its associated database 22. In another embodiment, voicemail messaging system 15 is further configured to enable a user to construct and schedule a voicemail message based on conditions that are checked at the time that the voicemail message is heard by the recipient.

System 15 thus enables users (voicemail senders) to include one or more expressions in the message that are evaluated and populated when the message is retrieved. System 15 also enables users to enter or select dynamic content variable from different modes such as from a PC (e.g., spoken or typed) or from an interactive menu provided by IVR system 16. To facilitate various different recording/listening modes, IVR system 16 or voicemail messaging system 15 may incorporate or be associated with a natural language automatic speech recognition (ASR) module for interpreting and parsing speech of the users, as well as standard speech-to-text (STT) and text-to-speech (TTS) converter modules. In this manner, when a message recipient listens to a recorded message the dynamic content portion is seamlessly retrieved and inserted therein.

FIG. 2 illustrates an example message format that includes static segments and a dynamic content portion. In accordance with one embodiment, the dynamic voicemail messaging system has an Action Mode (AM) and Recording Mode (RM). System 15 stores voicemail message in a basic format shown in FIG. 2, wherein a first normal voice recording segment (segment$_1$) is followed by dynamic-content-variable portion, and then by a second normal voice recording segment (segment$_2$). The dynamic-content-variable is the variable portion that is filled or inserted into the voicemail message at the time the message is retrieved by the recipient. It is appreciated that other embodiments may permit the dynamic portion to be inserted at the beginning of the message, at the end of the message, or permit multiple dynamic-content-variables to be inserted into a single voicemail message.

A user can switch between AM and RM modes in a variety of ways. For instance, a caller leaving a voicemail message may press or enter a predefined key sequence such as #11 to switch to AM, and #12 to switch to RM. When in AM, the system tags or treats all user input as a dynamic content variable. The system may also provide various mechanisms for the user to insert dynamic content variable in the message in AM. For example, the user can enter dynamic content variable either using an input device, such as a keyboard from his PC, or by entering the content verbally by responding to IVR menu prompts.

Figure 3:
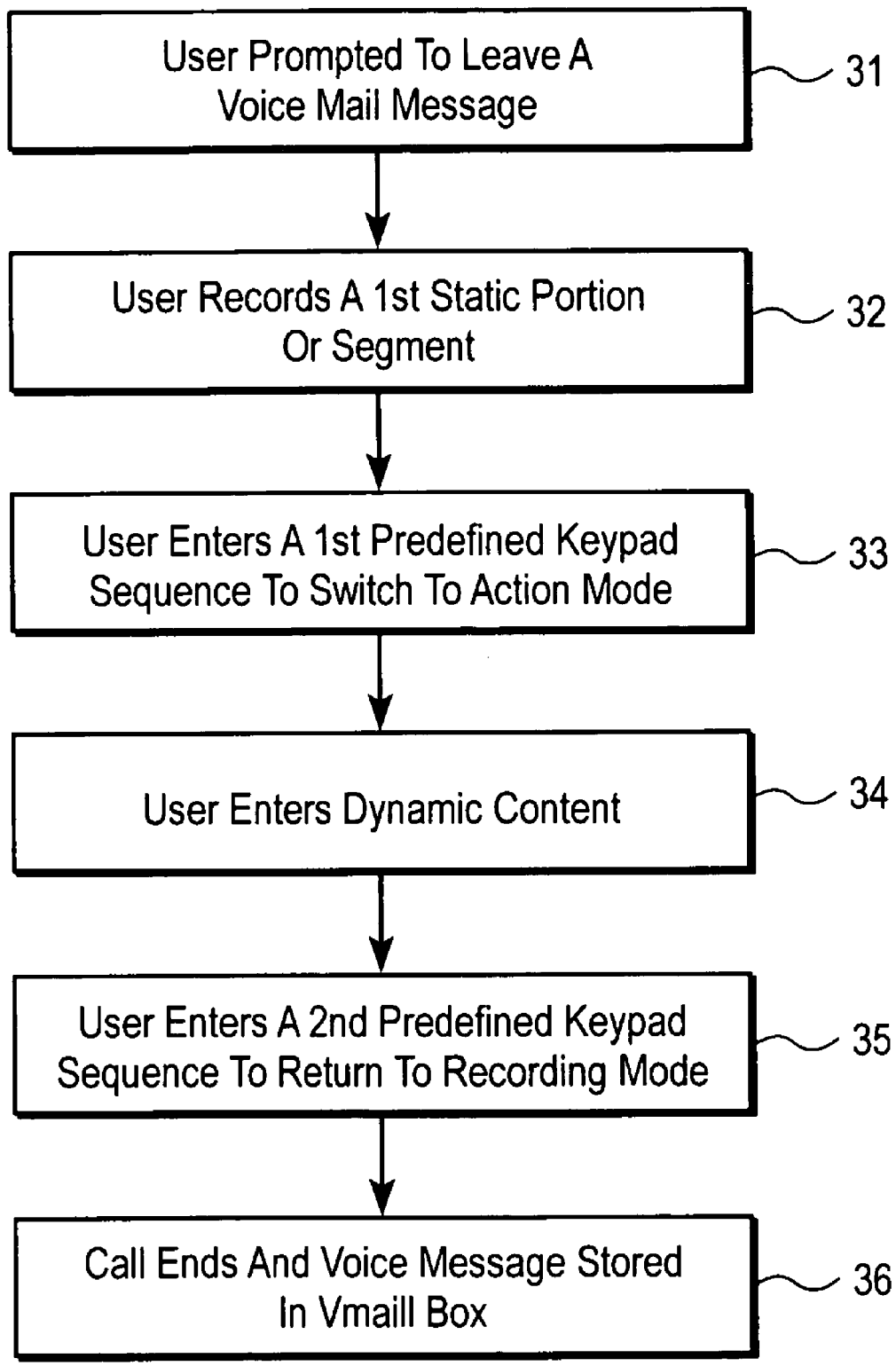
FIG. 3 illustrates an example method of leaving a voicemail message that includes a dynamic content portion.

FIG. 3 illustrates an example method of leaving a voicemail message that includes a dynamic content portion. The method begins at block 31, wherein after the user has placed a call but has been unsuccessful at reaching the callee, he is prompted by the voicemail system to leave a voicemail message for the callee. The user/caller begins speaking, and the user's speech is recorded in a first static portion or segment (block 32). In other words, as a default setting the system begins recording the message in Recording Mode. At some point during the recording the user decides that he wants to enter a dynamic-content-variable portion. To do so, he enters a first predefined keypad sequence on his endpoint device (e.g. #11 on his phone) in order to switch to Action Mode (block 33). Alternatively, the IVR system may be configured to accept verbal commands to switch to AM (as well as back to RM), e.g., "Switch to Action Mode".

Once in AM, the user may enter the dynamic content portion of the message, which portion may include, by way of example, a Uniform Resource Locator (URL) link to a server, client program, or database entry (block 34). After the user has completed entering the dynamic portion of the message, he may return to RM by pressing a second predefined keypad sequence, e.g., #12 on his keypad (block 35). Back in RM the user may record a second static portion of message and then hang-up to end the recording/call (block 36). At that point the voicemail message is stored in the recipient's voicemail mailbox until such time as it is retrieved for listening.

In one embodiment, the voicemail system provides a method to enter a variable or query (and its name) that can be subsequently utilized by users when leaving a dynamic content voicemail message. These predefined variables or queries can be either defined globally by a system administrator and/or on a per-user basis by the callers themselves. Examples of predefined variables or queries include, but are not limited to, combinations of database queries, web queries, calendar queries, address book queries, etc.

As an example scenario of use, consider a case where a business manager (Joe) wants to leave a message to each of his staff employees informing them of the number of defect tracking system (DTS) cases assigned to each individual. In accordance with the embodiments described above, Joe may leave a message having a first static segment that says, "The number of DTS cases assigned to you is", followed by a dynamic content variable portion (e.g., <DTS count of recipient>). When each employee listens to his or her voicemail message, they will hear the current number of DTS cases (a variable that changes over time) assigned to them.

In another example scenario, Sara is out of the office in a different city to attend a client business meeting. She would like to schedule an urgent meeting with her staff, so she calls to leave a message for her secretary to find one or more available slots in her calendar for the staff meeting with her team. At the same time, Sara schedules a voice message to be delivered the next day to the members of her staff. To do so, Sara enters into AM by pressing a keypad press which results in an IVR menu prompt that plays out her pre-configured variable names, from which she selects "Staff Meeting Time". The system then stores a URL link pointing to the time of her staff meeting (entered in her calendar client program) as a dynamic content variable. Meanwhile, Sara's secretary updates Sara's calendar with an available staff meeting date/time. When each member of Sara's staff retrieves their message, they are informed of the exact staff meeting date/time.

In this way, Sara need not wait for her secretary to call her back with staff meeting timings.

In one embodiment, a user may enter into AM from a PC by pressing a predefined key sequence (such as #112). In response, the voicemail messaging system identifies (for example, using a presence server) a machine where the user is logged in and displays a pop-up window or box on a GUI running on the user's PC. The user can then enter a URL link or a particular item in his/her calendar or any predefined query name (as described earlier) in the pop-up window or box. For instance, when the user clicks "OK" in the pop-up box, the inserted URL link or item is stored in the <dynamic-content-variable> portion of the message. The user can then switch back to RM by pressing another predefined key sequence (say, #113) to continue to record another static message portion.

In one embodiment, the user may drag and drop a particular item on the GUI window for value of a dynamic variable and the system automatically creates a reference to that item. For example, if the user drags and drops the "time" object for a meeting from his calendar program, then the system automatically creates a dynamic variable reference to the time of that meeting.

In another embodiment, a user can enter IVR AM by pressing a predefined key sequence, resulting in the IVR system playing out a set of user-predefined URL links or items. When a user selects a particular link or item from the IVR menu listing, it is stored in the <dynamic-content-variable> portion of the message. The user can also enter a URL by saying or spelling out the URL link, with the user's speech being translated into text by standard ASR and STT modules. The user can switch back to RM and continue to record an additional static portion of the message.

Figure 4:
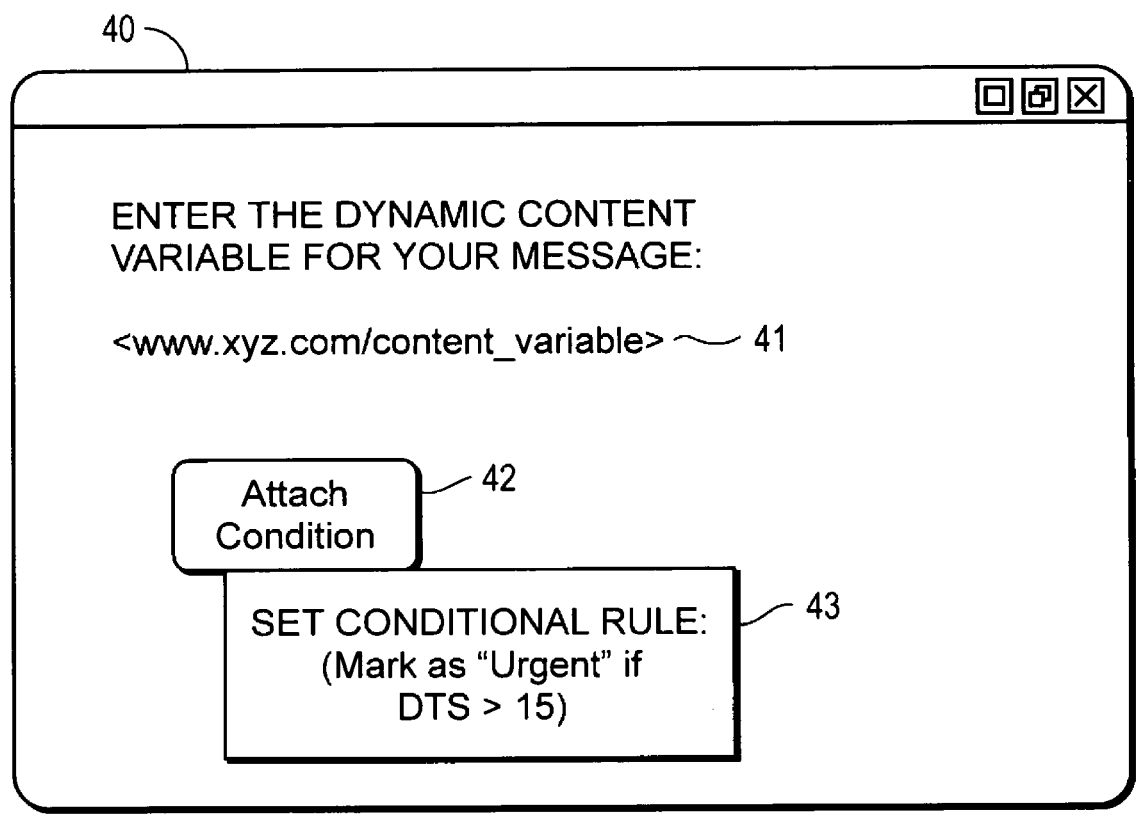
FIG. 4 illustrates an example graphical user interface (GUI) window for entering dynamic content into a voicemail message.

FIG. 4 illustrates an example graphical user interface (GUI) window 40 for entering dynamic content into a voicemail message where the content includes a conditional rule. In such an embodiment, the voicemail messaging system provides Condition Based Routing (CBR) for scheduled messages, wherein the message is sent or recorded if and only if the condition or expression is met. These messages, when scheduled, are tagged with a <condition> element. This <condition> element is associated with the <dynamic-content-variable> such that the <dynamic-content-variable> portion of the message is filled if and only if the condition occurs (e.g., the condition is "true"). The condition may involve a logical evaluation of a variable or expression. In other instances, the delivery of the message may be conditioned such that the message is delivered only when the <dynamic-content-variable> portion is true; otherwise, the message is dropped.

In the example of FIG. 4, the dynamic content portion comprises a URL link 41 (e.g., www.xyz.com/content_variable). The example also shows that the user has pressed/selected icon button 42 to make the message conditional on a rule set in pop-up window 43. In this case, the conditional rule that the user has set is that the message is to be marked as "Urgent" in the recipient's mailbox if the number of DTS cases (set as the content variable) is greater than 15. That is, if at the time the recipient listens to the message the DTS count is less than or equal to 15, the message is played out as a normal message. On the other hand, if the DTS count is greater than 15 when it is listened to, the listener is notified of the urgency of the message.

In one embodiment, the system periodically evaluates conditions that attach to a message. For example, a user (listener) may set a rule such that the system sends him a text message on his pager whenever he receives an urgent voicemail message. The system may be configured to evaluate the attached dynamic variable periodically, e.g., every half hour. In such a case, whenever the DTS count exceeds the preset limit (e.g., 15) during any evaluation period, the system marks the voicemail message as "Urgent", and then executes any user defined rules related to an urgent message, such as sending the user a text message.

An example scenario use of CBR for voicemail messaging is as follows. David is a stock trader who wants to schedule a voicemail message to be delivered to his stock broker, instructing him to sell all of his CSCO stock if the price of the stock rises above 25. David may schedule this message using CBR by inserting as the condition <(CSCO>25)> using either an IVR menu option mode or using a GUI running on his PC. At delivery time, the voicemail system identifies and locates the <condition> tag and checks <dynamic-content-variable>. In this case, the system continually monitors the price of CSCO stock. If the price of the stock rises above $25 per share, the recorded message (instructing a sale of all shares) is delivered to David's stock broker. If, on the other hand, the price of CSCO stock remains below 25, then the message is never sent. (In certain implementations the message may be discarded after a predetermined time period has elapsed, e.g., 30 days, without the condition occurring.) In a further embodiment, a notification is sent informing David that the message has been delivered (or discarded).

Figure 5:
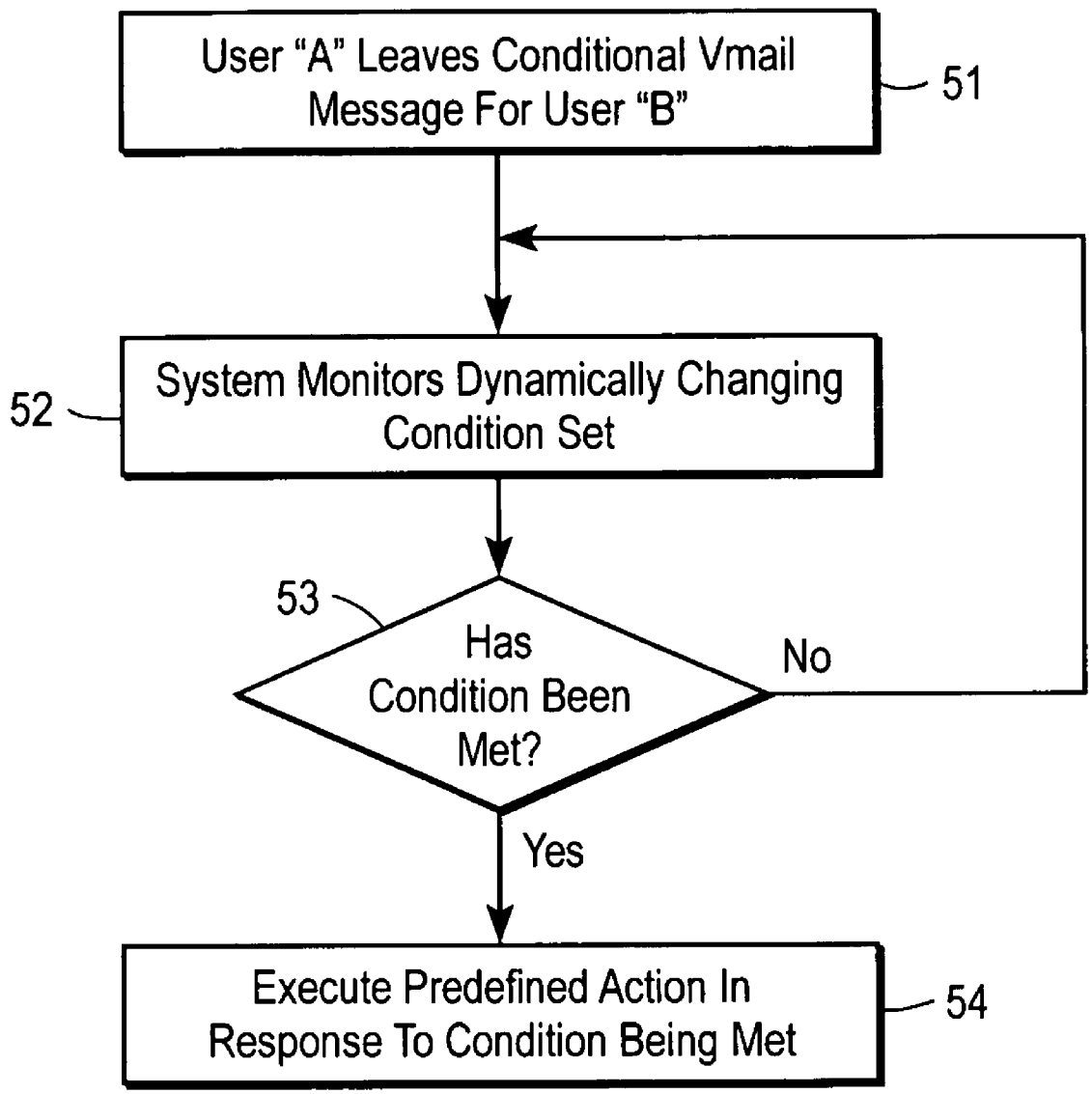
FIG. 5 illustrates an example method of operation wherein a voicemail message that includes a dynamic content portion containing a conditional variable is recorded in a voicemail messaging system.

FIG. 5 illustrates an example method of operation wherein a voicemail message that includes a dynamic content portion containing a conditional variable is recorded in a voicemail messaging system. The method begins (block 51) when a first user (User "A") records and leaves a conditional voicemail message in the system for a second user (User "B"). In this example, the system responds to the conditional message by continually monitoring the dynamically changing condition set by the user (block 52). For instance, as discussed in the example given above, the system may access a server that stores a current value of a variable (e.g., stock price) to determine whether the condition has been met. If the condition is met (block 53), then the system executes the predefined action set by the user (block 54). In the previous example scenario, for instance, the system may send the recorded message instructing the stockbroker to sell all shares of the stock that was being monitored for price change.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A system comprising:
    a voicemail mailbox; and
    means for recording a voicemail message that includes a
        static content portion and a dynamic content portion and for storing the voicemail message in the voicemail mailbox at a first point in time, the means also for inserting the dynamic content portion in the voicemail message at a second point in time later than the first point in time, the dynamic content portion changing from the first point in time to the second point in time, the means also for retrieving the voicemail message.

2. The system of claim 1 wherein the second point in time is when the voicemail message is accessed by a recipient.

3. The system of claim 1 wherein the dynamic content portion is inserted in the voicemail message periodically according to a predetermined configuration of the system.

4. The system of claim 1 wherein the dynamic content portion includes a conditional rule that specifies an action to be taken in the event that a condition is met.

5. The system of claim 4 wherein the condition comprises a logical evaluation of a variable.

6. A method comprising:
recording, at a first point in time, a voicemail message that includes at least one static portion and a dynamic content portion, the static portion being recorded in a first mode and the dynamic content portion being recorded in a second mode; and
retrieving information to fill the dynamic content portion at a second point in time when the voicemail message is accessed for listening by a recipient, the dynamic content portion charming from the first point in time to the second point in time.

7. The method of claim 6 wherein the information comprises a variable or query.

8. The method of claim 6 wherein the retrieving comprises accessing a server referenced by a Uniform Resource Locator (URL) link.

9. The method of claim 7 wherein the variable or query is predefined.

10. The method of claim 7 wherein the variable or query comprises a database query, a web query, a calendar query, or an address book query.

11. The method of claim 6 wherein the dynamic content portion includes a conditional rule that specifies an action to be taken in the event that a condition is met.

12. The method of claim 11 further comprising executing the action.

13. A method comprising:
recording, at a first point in time, a voicemail message that includes at least one static portion and a dynamic content portion, the static portion being recorded in a first mode and the dynamic content portion being recorded in a second mode;
monitoring a variable included in the dynamic content portion the variable being subject to chance over time;
sending, at a first point in time, the voicemail message to a recipient responsive to the variable satisfying a preset conditional rule.

14. The method of claim 13 further comprising storing the voicemail message in a voicemail mailbox assigned to the recipient.

15. The method of claim 13 further comprising accessing a server that stores a current value of the variable.

16. The method of claim 13 wherein the preset conditional rule comprises a logical expression that contains the variable.

17. A method comprising:
recording, in a first mode, speech of a user as a first portion of a voicemail message;
recording, in a second mode, a Uniform Resource Locator (URL) link as a second portion of the voicemail message; and
either periodically or at a time when the voicemail message is listened to by a recipient, retrieving a variable or expression from the URL link and inserting the variable or expression into the voicemail message.

18. The method of claim 17 wherein the variable or expression is inserted into the voicemail message as speech.

19. The method of claim 17 wherein the URL link comprises a link to a server, client program, or database entry.

20. The method of claim 17 further comprising switching from the first mode to the second mode in response to first input received from an endpoint device associated with the user.

21. The method of claim 20 further comprising:
switching from the second mode to the first mode in response to second input received from the endpoint device; and
recording, in the first mode, speech of a user as a third portion of the voicemail message.

22. A non-transitory computer-readable storage medium encoded with a computer program, which when executed, is operable to:
record, in a first mode, speech of a user as a first portion of a voicemail message;
record, in a second mode, a Uniform Resource Locator (URL) link as a second portion of the voicemail message; and
either periodically or at a time when the voicemail message is listened to by a recipient, retrieve a variable or expression from the URL link and insert the variable or expression into the voicemail message.

23. The non-transitory computer-readable storage medium of claim 22 wherein the variable or expression is inserted into the voicemail message as speech.

24. The non-transitory computer-readable storage medium of claim 22 wherein the URL link comprises a link to a server, client program, or database entry.

25. The non-transitory computer-readable storage medium of claim 22 wherein the computer program, when executed, is further operable to switch from the first mode to the second mode in response to first input received from an endpoint device associated with the user.

26. A non-transitory computer-readable storage medium encoded with a computer program, which when executed, is operable to:
record, at a first point in time, a voicemail message that includes at least one static portion and a dynamic content portion; and
monitor a variable included in the dynamic content portion, the variable being subject to change over time;
send, at a first point in time, the voicemail message to a recipient responsive to the variable satisfying a preset conditional rule.

* * * * *